US010298634B2

(12) United States Patent
Houchen et al.

(10) Patent No.: US 10,298,634 B2
(45) Date of Patent: May 21, 2019

(54) JOIN FEATURE RESTORATION TO ONLINE MEETING

(71) Applicant: MICROSOFT TECHNOLOGY LICENSING, LLC, Redmond, WA (US)

(72) Inventors: Stephen H. Houchen, Redmond, WA (US); Anthony C. Romano, Redmond, WA (US); William Hanlon, Redmond, WA (US); Barnett Trzcinski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 15/368,217

(22) Filed: Dec. 2, 2016

(65) Prior Publication Data

US 2018/0063208 A1 Mar. 1, 2018

Related U.S. Application Data

(60) Provisional application No. 62/380,479, filed on Aug. 28, 2016.

(51) Int. Cl.
*G06F 15/16* (2006.01)
*H04L 29/06* (2006.01)
(Continued)

(52) U.S. Cl.
CPC ......... *H04L 65/403* (2013.01); *G06Q 10/109* (2013.01); *H04L 65/1069* (2013.01); *H04L 67/02* (2013.01)

(58) Field of Classification Search
USPC ................................ 709/204, 223, 228, 206
See application file for complete search history.

(56) References Cited

U.S. PATENT DOCUMENTS 7,995,466 B2 8/2011 Baker et al.
8,296,379 B2 10/2012 Chen et al.
(Continued)

FOREIGN PATENT DOCUMENTS

WO 2011020729 A1 2/2011
WO 2015102843 A1 7/2015

OTHER PUBLICATIONS

"Create a meeting request for an online meeting or conference call", Published on: Sep. 24, 2015 Available at: https://support.office.com/en-us/article/Create-a-meeting-request-for-an-online-meeting-or-conference-call-4a0518dc-1993-4dc5-b298-abe0162dc225.
(Continued)

*Primary Examiner* — Liang Che A Wang
(74) *Attorney, Agent, or Firm* — Schwegman Lundberg & Woessner, P.A.

(57) ABSTRACT

Features to join an online meeting are crucial to successfully conducting the online meeting. Accordingly, embodiments are directed to restoration of such features to an online meeting generated without a join feature or an online meeting in which the join feature was never added or accidentally removed. A client application may be configured to receive an online meeting, detect an absence of metadata associated with a join feature upon analysis of the online meeting, parse a body of the online meeting to detect a collection of one or more URLs, verify each of the URLs with a HTTP get operation, and in response to a determination that a URL comprises an online meeting identifier, recreate the metadata with the URL to generate the join feature. Once restored, the join feature may be presented within an invitation for the online meeting.

17 Claims, 10 Drawing Sheets

(51) Int. Cl.
*G06Q 10/10* (2012.01)
*H04L 29/08* (2006.01)

(56) References Cited

U.S. PATENT DOCUMENTS

| | | |
|---|---|---|
| 8,483,375 B2 | 7/2013 | Dhara et al. |
| 8,555,339 B2 | 10/2013 | McGloin et al. |
| 8,676,792 B1 | 3/2014 | Scatamacchia et al. |
| 8,832,205 B2 | 9/2014 | Nelson et al. |
| 9,210,267 B2 | 12/2015 | Bennett, Jr. |
| 2008/0147469 A1 | 6/2008 | Murillo et al. |
| 2008/0278740 A1 | 11/2008 | Bird et al. |
| 2009/0005038 A1 | 1/2009 | Yasrebi et al. |
| 2010/0189244 A1 | 7/2010 | Sastry |
| 2012/0185291 A1 | 7/2012 | Ramaswamy et al. |
| 2013/0007648 A1 | 1/2013 | Gamon et al. |
| 2013/0018969 A1 | 1/2013 | Samdadiya et al. |
| 2014/0095871 A1 | 4/2014 | Hoard et al. |
| 2014/0188540 A1 | 7/2014 | Cole et al. |
| 2015/0095430 A1 | 4/2015 | Kaushik et al. |
| 2015/0281460 A1 | 10/2015 | Chandak et al. |
| 2015/0286731 A1* | 10/2015 | Khosravy ............ G06Q 30/02 707/722 |
| 2015/0288701 A1 | 10/2015 | Brand |
| 2016/0247123 A1* | 8/2016 | Holst ................ G06Q 10/1095 |
| 2016/0247124 A1* | 8/2016 | Holst ................ G06Q 10/1095 |
| 2016/0307165 A1* | 10/2016 | Grodum ............ G06Q 10/1095 |
| 2018/0063045 A1 | 3/2018 | Houchen et al. |

OTHER PUBLICATIONS

"Create an Add to calendar link in an email message", Retrieved on: Aug. 30, 2016 Available at: https://support.office.com/en-us/article/Create-an-Add-to-calendar-link-in-an-email-message-34f8ea28-322a-4867-b423-2998f9634e59#_add_a_text.

"Best Practices to Join External Skype for Business (Lync) Meeting or Audio Call", Retrieved from http://communicationsknowledge.blogspot.com/2015/11/best-practices-to-join-external-skype.html, Nov. 7, 2015, 15 Pages.

"Forward a Meeting", Retrieved from https://support.office.com/en-US/article/Forward-a-meeting-94F2DF68-8109-4334-8BFA-F5C013DC1578, Retrieved on Aug. 31, 2016, 3 Pages.

"Mailbox Delegate not Receiving Notification for Meeting Requests", Retrieved from https://community.spiceworks.com/topic/893917-mailbox-delegate-not-receiving-notification-for-meeting-requests, Apr. 14, 2015, 2 Pages.

"Schedule a Meeting with Other People", Retrieved from https://kb.wisc.edu/page.php?id=31143, Sep. 11, 2015, 2 Pages.

"Sharing your Calendar in Outlook Web App", Retrieved from https://web.archive.org/web/20150916184952/https://support.office.com/en-us/article/sharing-your-calendar-in-outlook-Web-App-7ecef8ae-139c-40d9-bae2-a23977ee58d5,Sep. 16, 2015, 8 Pages.

"User not Receiving Request for Appointments", Retrieved from https://www.techrepublic.com/forums/discussions/user-not-receiving-request-for-appointments/, Retrieved on Aug. 31, 2016, 5 Pages.

Aaron, "Google Calendar Help Forum", Retrieved from https://productforums.google.com/forum/#!topic/calendar/AsVmojch0y4, Jan. 4, 2011, 18 Pages.

"Non Final Office Action Issued in U.S. Appl. No. 15/367,727", dated Dec. 13, 2018, 10 Pages.

* cited by examiner

JOIN FEATURE RESTORATION TO ONLINE MEETING

CROSS-REFERENCE TO RELATED APPLICATION

This application claims benefit under 35 U.S.C. § 119(e) of U.S. Provisional Application No. 62/380,479 filed on Aug. 28, 2016. The U.S. Provisional Application is herein incorporated by reference in its entirety.

BACKGROUND

Features to join an online meeting such as a join link are crucial to successfully conducting the online meeting. However, for a variety of reasons, an online meeting may be generated without a join link or the join link may be accidently removed from the online meeting. For example, an invitee may be associated with an organization that is not federated with an organization of the organizer. As such, metadata of the online meeting that includes features to join the meeting may be erased or dropped when delivering the online meeting to the invitee. An organizer may also copy and paste the online meeting to another meeting invitation and the join features may fail to be added to the other meeting invitation. As a result, restoring join features to an online meeting may be important to successfully conducting the meeting.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to restoration of a join feature to an online meeting. For example, a productivity service may receive an online meeting, detect an absence of a metadata associated with the join feature upon analysis of the online meeting, parse a body of the online meeting to detect a collection of URLs, verify each URL of the collection with a HTTP get operation, in response to a determination that a URL from the collection comprises an online meeting identifier recreate the metadata of the online meeting with the URL to generate the join feature, and update the online meeting with the metadata such that the join feature is able to be restored upon execution of one or more operations. Some of these actions may be performed similarly by a client, such as an application of the productivity service executing on a client device.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, embodiments are directed to restoration of a join feature to an online meeting. The join feature may be a join link and/or a join button configured to execute an operation to join the online meeting. A productivity service or a client application associated with the productivity service may initiate operations to restore the join feature upon receiving an online meeting. For example, an online meeting may be analyzed to detect an absence of a metadata associated with the join feature. In response, a body of the online meeting may be parsed to detect a collection of URLs, each URL of the collection may be verified with a HTTP get operation, and in response to a determination that a URL from the collection comprises an online meeting identifier, the metadata of the online meeting may be created with the URL to generate the join feature.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to restore a join feature to an online meeting. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1A:
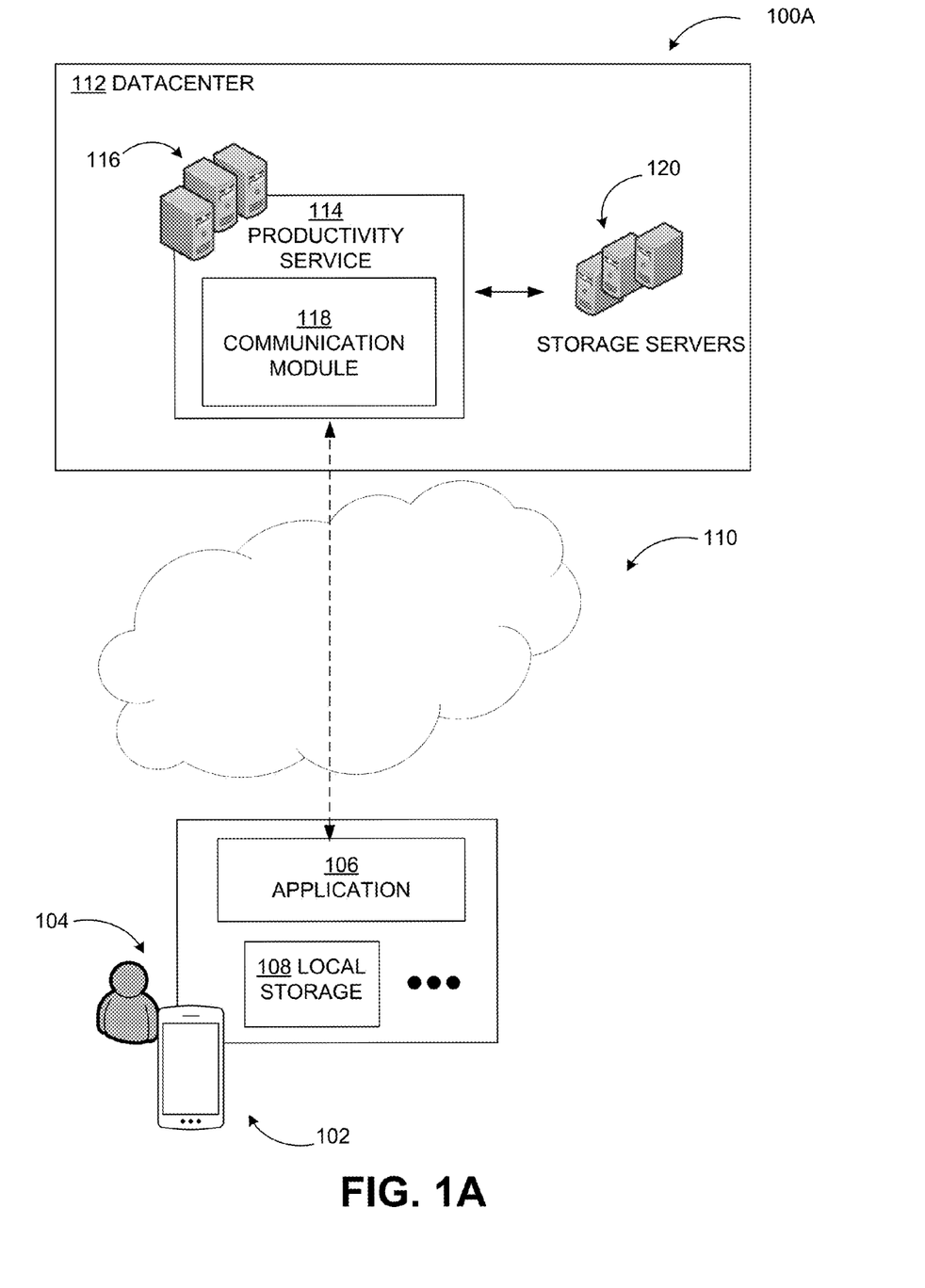
FIGS. 1A-C include display diagrams illustrating example network environments where restoration of a join feature to an online meeting may be implemented.
Figure 1B:
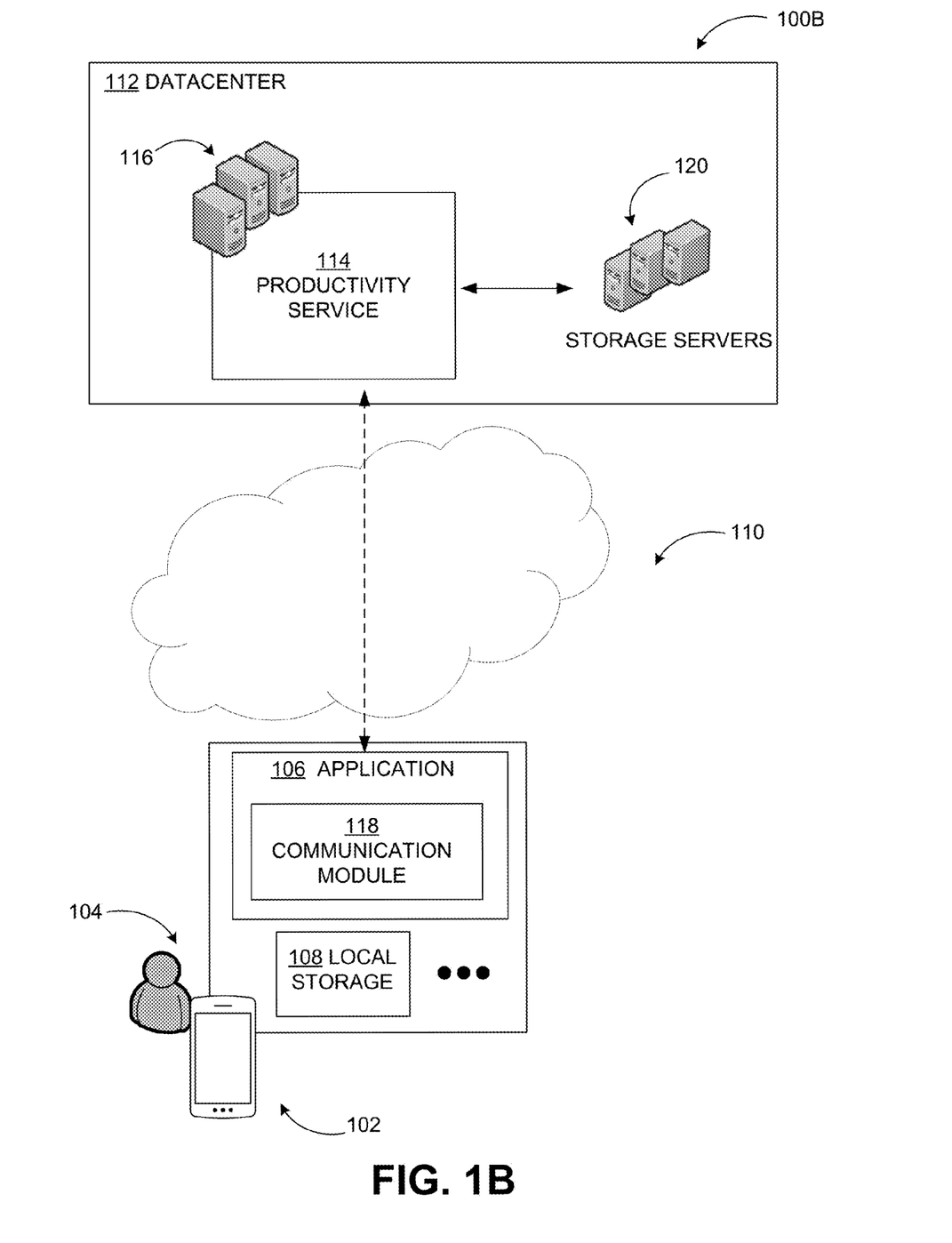
Figure 1C:
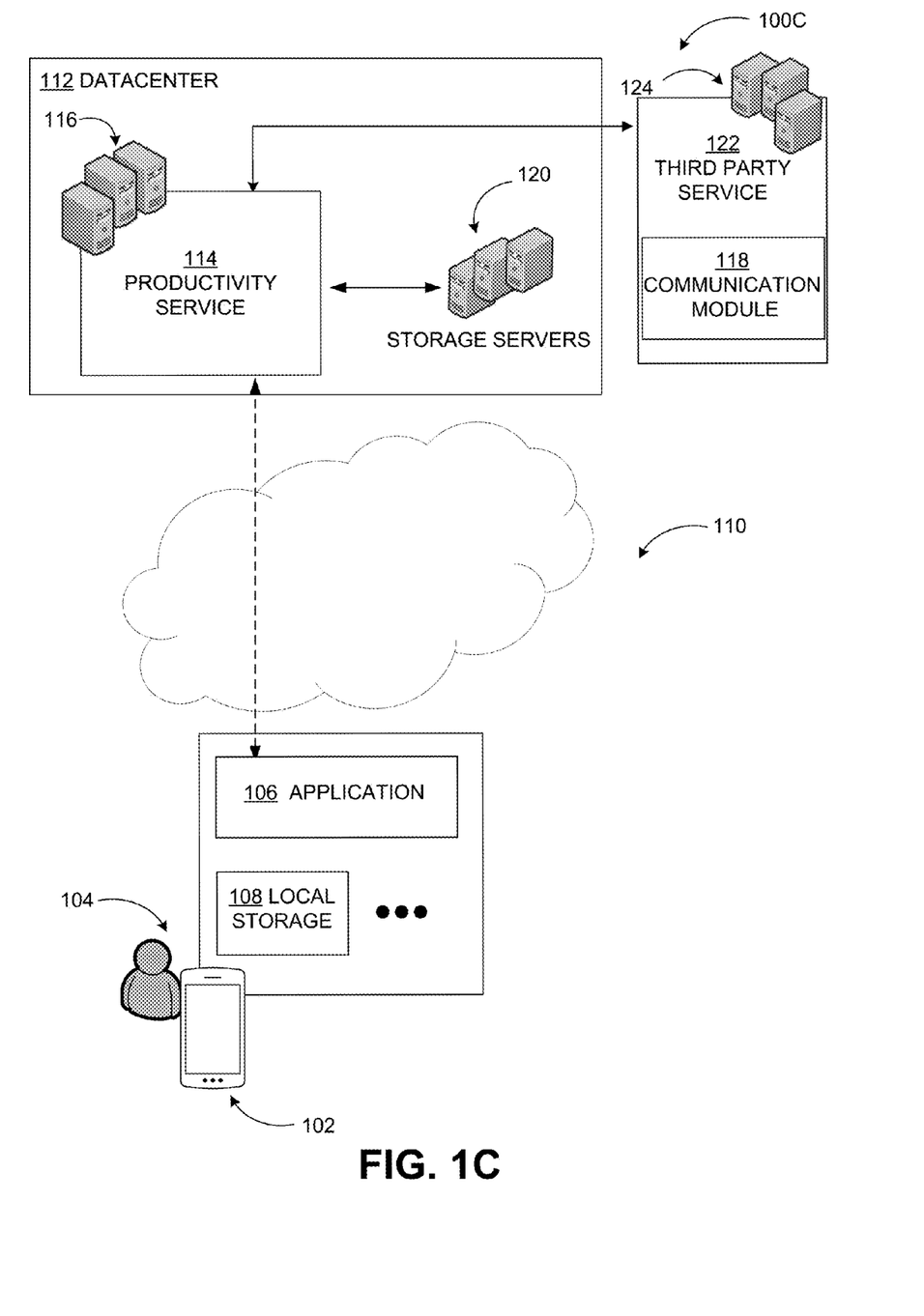

FIGS. 1A-C include display diagrams illustrating example network environments where restoration of a join feature to an online meeting may be implemented. As illustrated in diagrams 100A-C, an example system may include a datacenter 112 hosting a cloud-based productivity service 114 configured to enable users to create, edit, and/or share content among multiple devices and across a variety of platforms. The datacenter 112 may include one or more processing servers 116 configured to execute the productivity service 114, among other components. The datacenter 112 may also include one or more storage servers 120 configured to manage one or more data stores comprising data associated with the productivity service 114. As described herein, the productivity service 114 may be implemented as software, hardware, or combinations thereof.

In some embodiments, the productivity service 114 may be configured to interoperate with various applications. For example, as illustrated in the diagrams 100A-C, a user 104 may execute a thin (e.g., a web browser) or a thick (e.g., a locally installed client application) version of an application 106 through a device 102 with which the productivity service 114 may be configured to integrate and interoperate with over one or more networks, such as network 110. The application 106 may be an application hosted by the productivity service 114. The application 106 may be configured to store information, such as an online meeting, in local storage 108 of the device, or provide the information to the productivity service 114 for remote storage at the storage servers 120. The application 106 may be a communication application, a calendar application, a word-processing application, a notebook application, and/or a spreadsheet application among other examples. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In one embodiment, as illustrated in diagram 100A, at least one of the processing servers 116 may be operable to execute a communication module 118 of the productivity service 114, where the communication module 118 may be integrated with the productivity service 114 to restore a join feature to an online meeting. In another embodiment, as illustrated in diagram 100B, the application 106 may be operable to execute the communication module 118, where the communication module 118 may be integrated with the application 106. In a further embodiment, as illustrated in diagram 100C, the communication module 118 may be a separate module associated with and/or executed by one or more processing servers 124 of a third party service 122 configured to serve multiple applications, such as the application 106 of the productivity service 114.

In an example embodiment, an online meeting may be generated by a meeting organizer through the application 106. Alternatively, the online meeting may be provided from the third party service 122, such as a calendar provider. The online meeting may be newly generated or the online meeting may be already existent but recently edited. The communication module 118 may be configured to receive the online meeting and analyze the online meeting to detect an absence of metadata. The absent metadata may include information to generate and/or insert a join feature, such as a join link, into the online meeting.

In response to detecting the absence of the metadata, the communication module 118 may parse a body of the online meeting to detect a collection of one or more URLs. The communication module 118 may be configured to employ pattern matching to identify the collection of URLs. Each URL of the collection may be verified with a HTTP get operation to determine whether any of the URLs comprise an online meeting identifier.

In response to a determination that single URL comprises an online meeting identifier, the communication module 118 may be configured to recreate the metadata with the URL to generate a join feature. The metadata may also be recreated in response to a determination that multiple URLs have a same online meeting identifier. The join feature may be a join link and/or a join button configured to execute an operation to join the online meeting. The communication module 118 may then be configured to update the online meeting with the metadata such that the join feature is able to be restored in response to receiving a notification of an invitee's intent to join the online meeting such that the invitee is enabled to join the online meeting using the join feature. Alternatively, the communication module 118 may be configured to immediately insert the join feature into the online meeting upon its generation. The join feature may be provided for display through a user experience of the application 106. For example, the join feature may be presented within an invitation for the online meeting.

In response to a determination, the no URLs comprise a meeting identifier, the recreation of the metadata is foregone. Similarly, in response to a determination that multiple URLs comprise online meeting identifiers and those online meeting identifiers are distinct, the recreation of the metadata is foregone Some of the actions and/or processes described herein have been illustrated from the perspective of a server (for example, the processing servers 116 configured to execute the productivity service 114), however similar actions may be performed similarly by a client (for example, the application 106), among other entities.

As previously discussed features to join an online meeting are crucial to successfully conducting the online meeting, however an online meeting may be generated without join link metadata or the join link metadata may fail to be added or may be accidentally removed. Embodiments are directed to restoration of a join feature to ensure the meeting is successfully conducted. The restoration of the join feature may improve performance, increase reliability, and reduce processing and network bandwidth usage by employing pattern matching and verification techniques to detect the URL. Additionally, the restoration of the join feature may improve user interaction by enabling a user to easily join an online meeting.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with user communication through productivity services hosted across a variety of platforms and devices.

Figure 2:
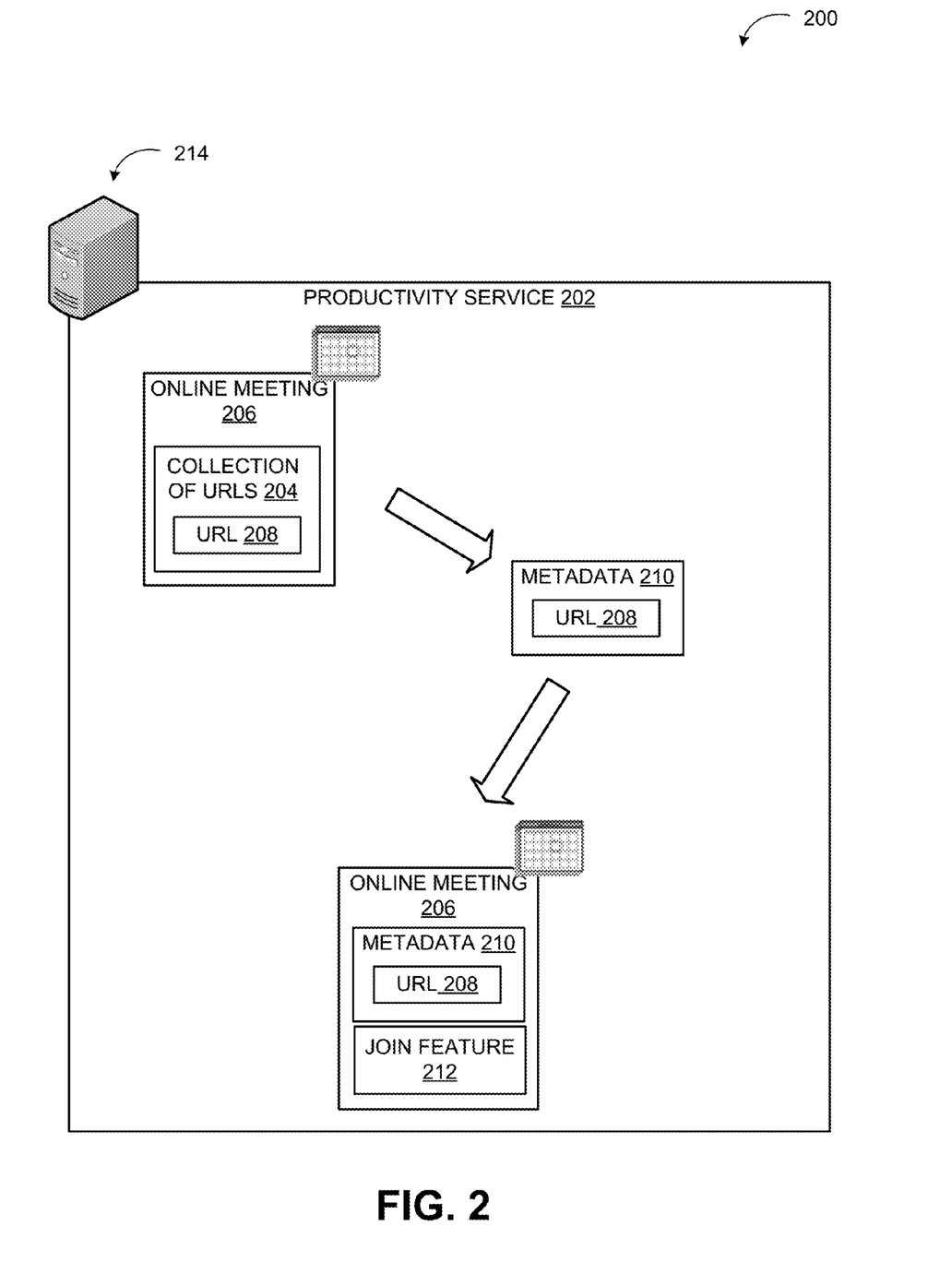
FIG. 2 includes a display diagram illustrating an example scheme to restore a join feature to an online meeting.

FIG. 2 includes a display diagram illustrating an example scheme to restore a join feature to an online meeting. As shown in a diagram 200, a productivity service 202, executed by one or more processing servers 204, may be configured to generate and restore a join feature to an online meeting. The productivity service 202 may be configured to receive and analyze an online meeting 206. During the analysis, an absence of metadata associated with a join feature of the online meeting may be detected.

In response to detecting the absence of the metadata, the productivity service 202 may be configured to parse a body of the online meeting 206 to detect a collection of URLs 204. The body of the online meeting 206 may be formatted in hypertext markup language (HTML). A collection of the URLs 204 that start with http:// and https:// may be detected by employing pattern matching within the body of the online meeting 206. Each URL of the collection of URLs 204 may be verified with a HTTP get operation (and/or a HTTPs get operation). Verification reveal whether or not each URL has an online meeting identifier. A number of URLs in the collection of the URLs 204 may be limited to prevent processing and verification of a large number of the URLs to save computational resources and prevent unnecessary processing of wrong candidate URLs. For example, prior to verification, duplicate URLs may be removed from the collection of URLs 204. For further example, after verification, if no URL comprises an online meeting identifier, the restoration of the join feature may be blocked. Similarly, if multiple URLs in the same body of the online meeting 206 body comprise online meeting identifiers that are distinct from one another, the restoration of the join feature may be blocked because there may be no objective way to determine which one of the multiple URLs is the intended link to the online meeting. If exactly one URL comprises an online meeting identifier, such as URL 208, then the productivity service 202 may assume URL 208 is the valid link for the online meeting. The productivity service 202 may automatically recreate the metadata 210 with the URL 208 to generate the join feature 212 and insert the metadata 210 with the URL 208 into the online meeting 206.

The productivity service 202 may be configured to execute operations to restore the join feature 212 upon receiving a notification of a meeting invitee's intent to join the online meeting 206. The productivity service 202 may restore the join feature 212 to allow the invitee to join the online meeting 206 by using the join feature 212. The productivity service 202 may also be configured to execute operations to restore the join feature 212 when the online meeting 206 is generated. The join feature 212 may be provided for display through an invitation to the online meeting 206.

The actions and/or processes described herein have been illustrated from the perspective of a server (for example, the processing servers 204 configured to execute the productivity service 202). However, alternative embodiments are directed toward a client application being configured to restore the join feature for an online meeting (for example, an application associated with the productivity service 202 that is being executed by a client device). Some of the actions and/or processes may be performed similarly by the client application FIG. 3 includes a display diagram illustrating an example online meeting. A productivity service may be configured to restore a join feature to an online meeting. Upon receipt, an online meeting may be analyzed to detect an absence of metadata associated with a join feature of the online meeting. In response to detecting the absence of the metadata, a body of the online meeting may be parsed to detect a collection of URLs. Upon determination that one of the URLs from the collection may include a destination that may be used to join the online meeting (that is, the URL comprised an online meeting identifier). The metadata may be recreated with the URL to generate the join feature.

Figure 3:
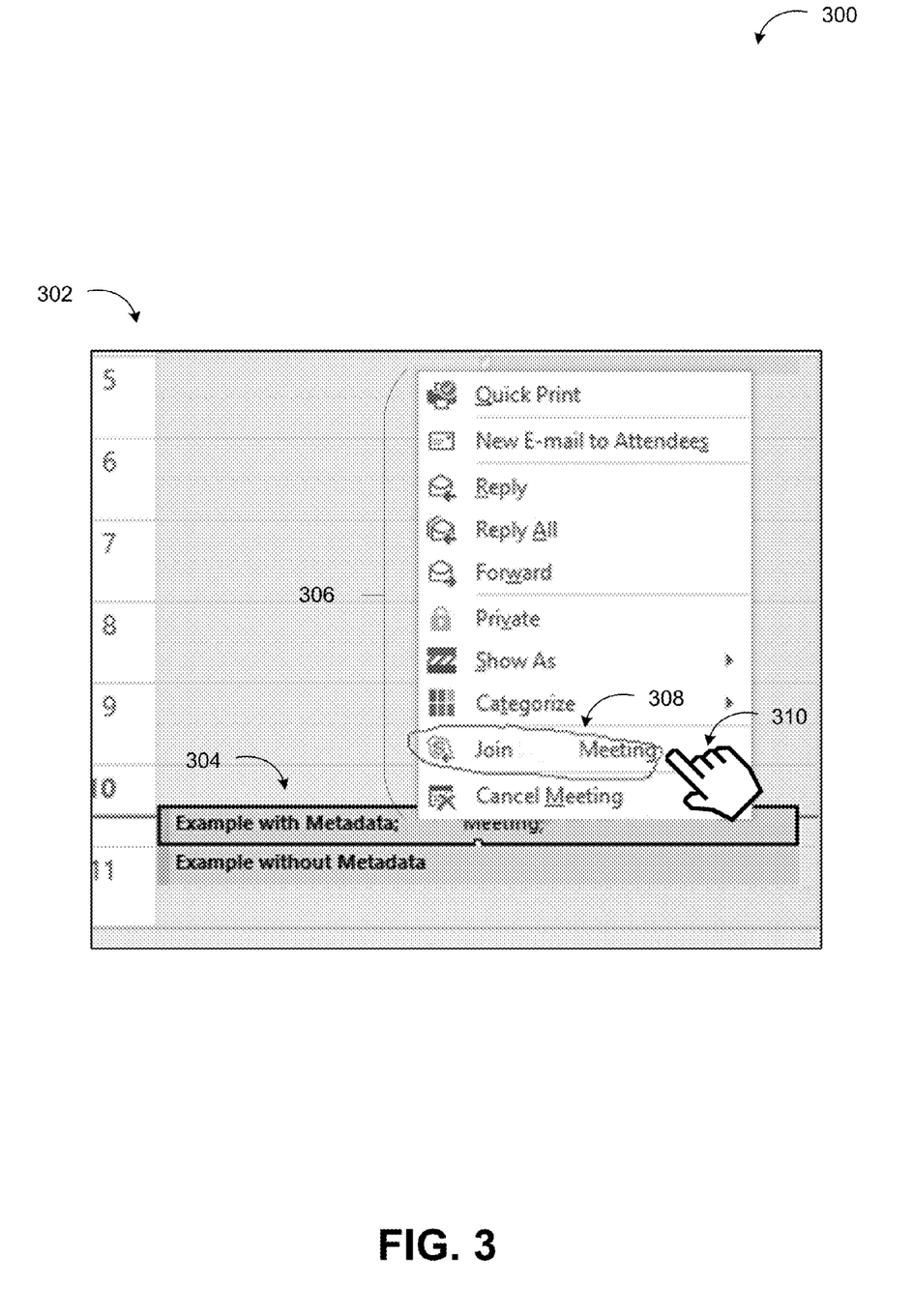
FIG. 3 includes a display diagram illustrating an example online meeting.

As shown in a diagram 300, a client interface (or a client application) associated with the productivity service, such as a communication application comprising a scheduling component 302, may access the metadata to generate a join feature 308. In response to a user selection of the online meeting 304 through the scheduling component 302, the join feature 308 may be displayed in a menu 306 among other features associated with the online meeting 304. The other features may include to communicate with attendees of the online meeting and cancel the online meeting, for example. Additionally, and/or alternatively, the join feature 308 may be presented within an invitation to the online meeting, as described in more detail in FIG. 4.

Figure 4:
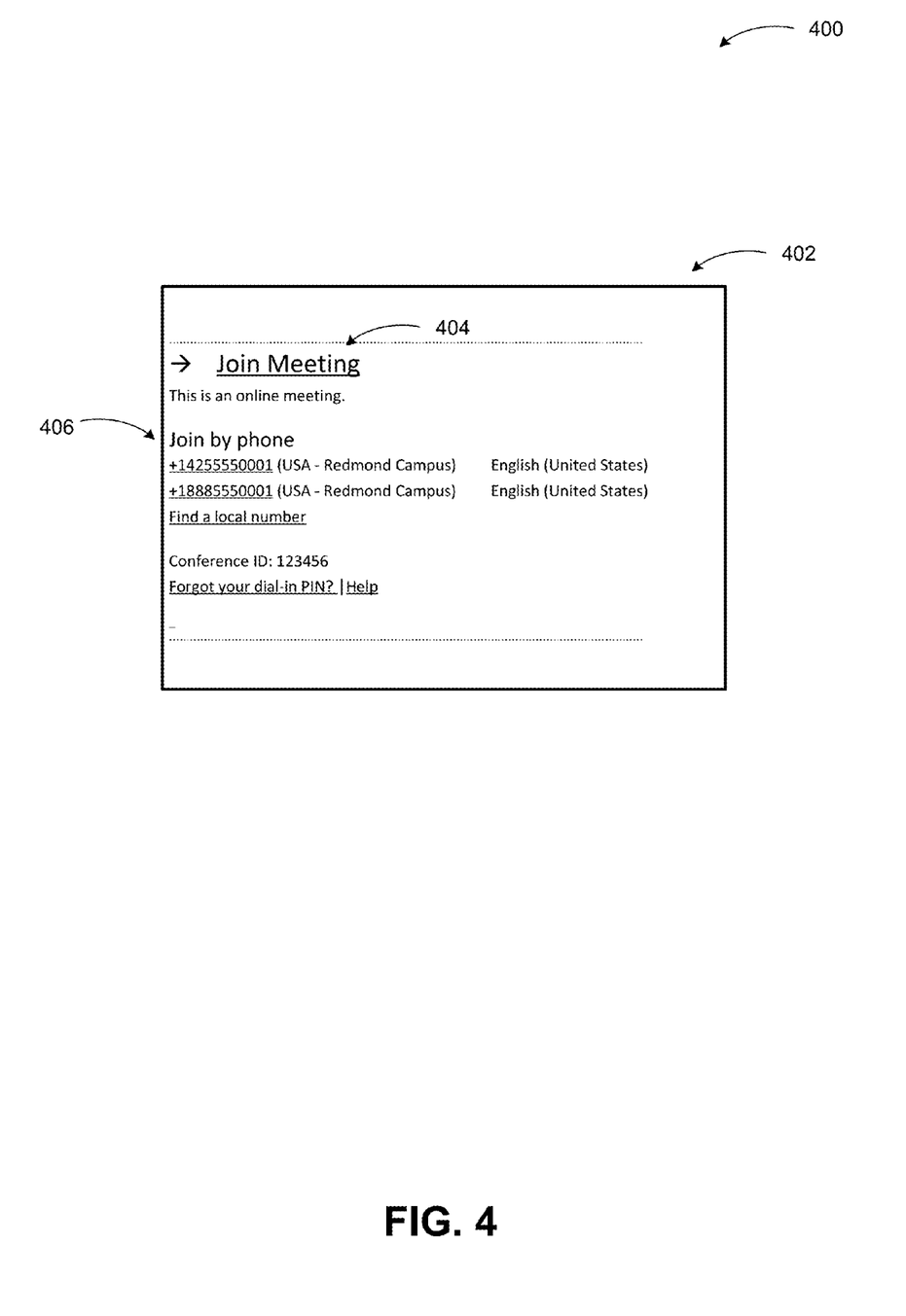
FIG. 4 includes a display diagram illustrating an example user experience rendering a join feature.

FIG. 4 includes a display diagram illustrating an example user experience rendering a join feature. A productivity service may be configured to restore a join feature to an online meeting. Upon receipt, an online meeting may be analyzed to detect an absence of metadata associated with a join feature of the online meeting. In response to detecting the absence of the metadata, a body of the online meeting may be parsed to detect a collection of URLs. Upon determination that one of the URLs from the collection may include a destination that may be used to join the online meeting (that is, the URL comprised an online meeting identifier). The metadata may be recreated with the URL to generate the join feature.

As shown in a diagram 400, a client interface (or a client application) associated with the productivity service, such as a communication application, may access the recreated metadata to restore a join feature 404. The productivity service may also provide a user experience to present the join feature 404 within an invitation to the online meeting 402. Additional join features 406, such as options to join the meeting by phone, may also be provided within the invitation to the online meeting 402.

The examples provided in FIG. 1 through FIG. 4 are illustrated with specific systems, services, applications, modules, and user experiences. Embodiments are not limited to environments according to these examples. Restoration of a join feature to an online meeting may be implemented in environments employing fewer or additional systems, services, applications, modules, and user experiences. Furthermore, the example systems, services, applications, modules, and user experiences shown in FIG. 1 through FIG. 4 may be implemented in a similar manner with other values using the principles described herein.

Figure 5:
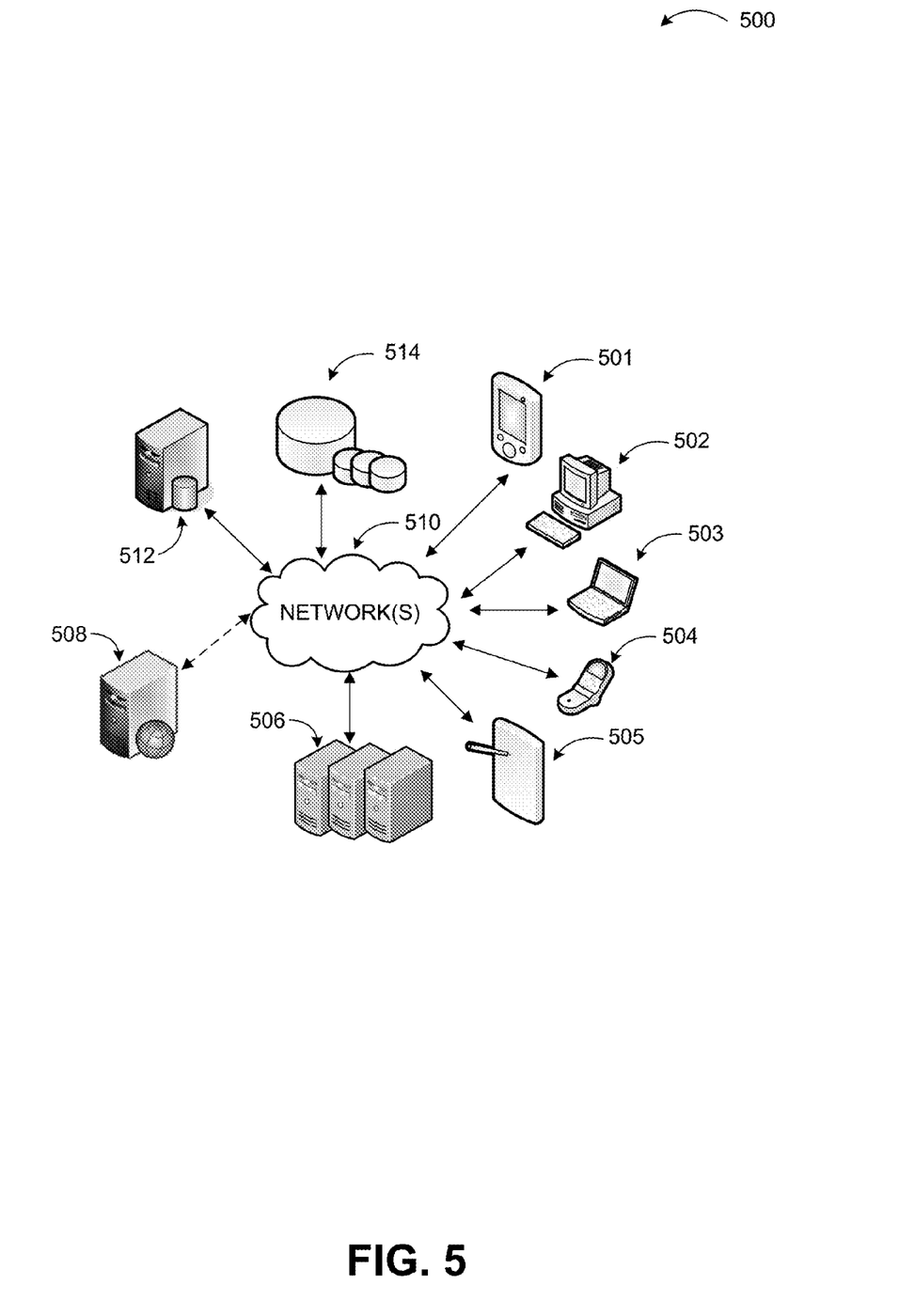
FIG. 5 is an example networked environment, arranged in accordance with at least some embodiments described herein.

FIG. 5 is an example networked environment, arranged in accordance with at least some embodiments described herein. In addition to locally installed applications (for example, application 106), a communication module may also be employed in conjunction with hosted applications and services (for example, a productivity service 114) that may be implemented via software executed over one or more servers 506 or individual server 508, as illustrated in diagram 500. A hosted service or application may communicate with client applications on individual computing devices such as a handheld computer 501, a desktop computer 502, a laptop computer 503, a smart phone 504, a tablet computer (or slate), 505 ('client devices') through network(s) 510 and control a user interface presented to users.

Client devices 501-505 are used to access the functionality provided by the hosted service or application. One or more of the servers 506 or server 508 may be used to provide a variety of services as discussed above. Relevant data may be stored in one or more data stores (e.g. data store 514), which may be managed by any one of the servers 506 or by database server 512.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, engines, and modules may be employed to restore a join feature to an online meeting. Furthermore, the networked environments discussed in FIG. 5 are for illustration purposes only. Embodiments are not limited to the example services, applications, engines, modules or processes.

Figure 6:
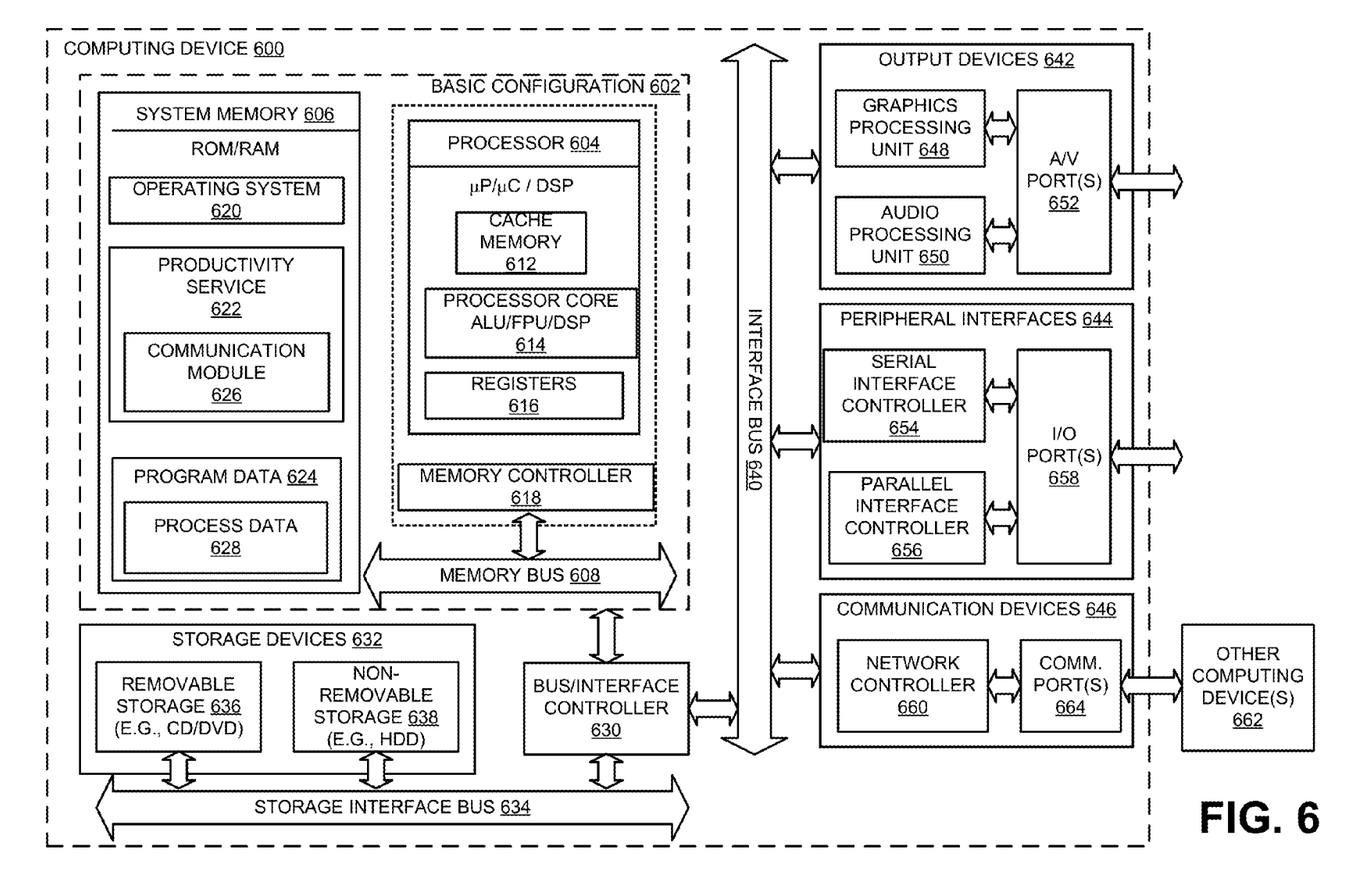
FIG. 6 illustrates a general purpose computing device, which may be configured to restore a join feature to an online meeting, arranged in accordance with at least some embodiments described herein.

FIG. 6 illustrates a general purpose computing device, which may be configured to restore a join feature to an online meeting, arranged in accordance with at least some embodiments described herein.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a productivity service 622, and program data 624. The productivity service 622 may include a communication module 626, which may be an integrated module of the productivity service 622. In other embodiments, the communication module 626 may be an integrated module of a locally installed application of the productivity service 622 or the communication module 626 may be a separate module associated with a third party service configured to serve multiple applications of the productivity service 622. The communication module 622 may be configured to restore a join feature to an online meeting. For example, the communication module 622 may be configured to receive an online meeting, detect an absence of a metadata upon analysis of the online data, parse a body of the online meeting to detect a URL, verify the URL with a HTTP get operation, recreate the metadata with the URL, and update the online meeting with the metadata. The program data 624 may include, among other data, process data 628 such as the metadata and URLs as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to restore a join feature to an online meeting invitation. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
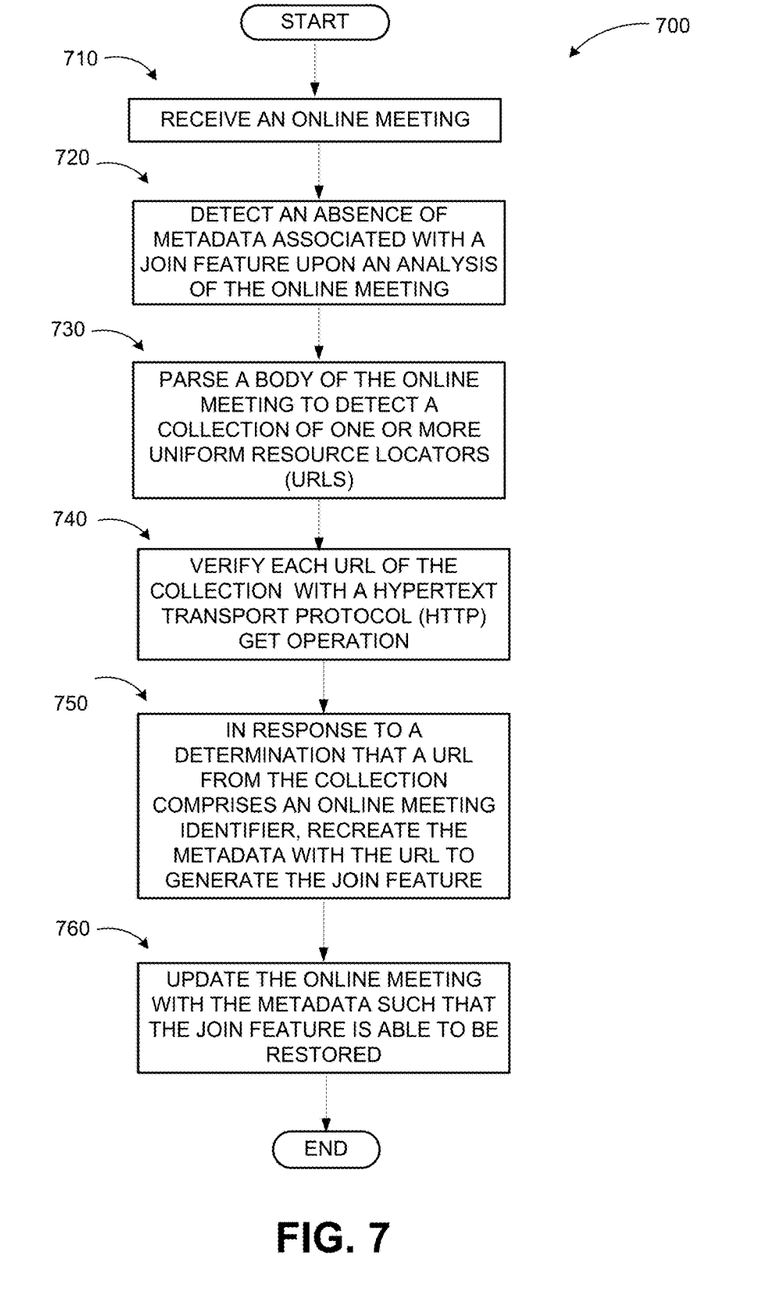
FIG. 7 illustrates a logic flow diagram for an example server-side process to restore a join feature to an online meeting.

FIG. 7 illustrates a logic flow diagram for an example server-side process to restore a join feature to an online meeting, arranged in accordance with at least some embodiments described herein. Process 700 may be implemented on a computing device, server, or other system. An example system may include a communication interface configured to facilitate communication between a productivity service and an application of the productivity service, a memory configured to store instructions, and one or more processors coupled to the memory and configured to execute a communication module, wherein the communication module is configured to restore a join feature to an online meeting.

Process 700 begins with operation 710, where a productivity service may receive an online meeting. The online meeting may be received from the application of the productivity service following generation of the online meeting by a meeting organizer through the application. Alternatively, the online meeting may be received from a third party service, such as a calendar provider.

At operation 720, the productivity service may detect an absence of metadata associated with the join feature upon analysis of the online meeting. The absent metadata may include information to generate and/or insert a join feature, such as a join link, into the online meeting.

At operation 730, the productivity service may parse a body of the online meeting to detect a collection of URLs by employing pattern matching. At operation 740, the productivity service may verify each of the URLs of the collection with a HTTP get operation to determine whether any of the URLs have an online meeting identifier.

At operation 750, upon determination that a URL from the collection comprises an online meeting identifier, the productivity service may recreate the metadata with the URL to generate the join feature. Additionally, the productivity service may recreate the metadata with the URL to generate the join feature in response to a determination that multiple URLs of the collection comprise a same online meeting identifier. The join feature may be a join link and/or a join button configured to execute an operation to join the online meeting. At operation 760, the productivity service may then update the online meeting with the metadata such that the join feature is able to be restored.

The operations included in process 700 are for illustration purposes. Restoration of a join feature to an online meeting may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

Figure 8:
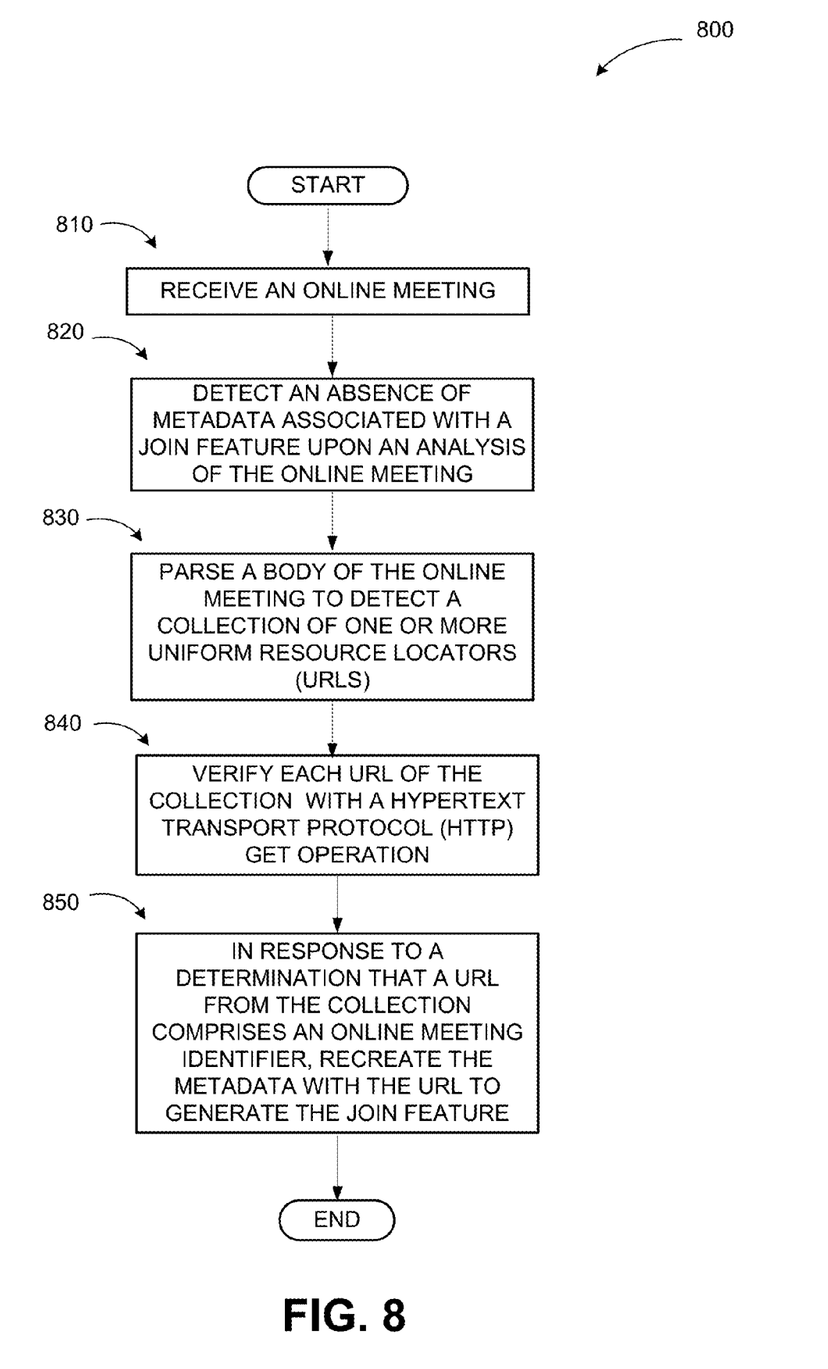
FIG. 8 illustrates a logic flow diagram for an example client-side process to restore a join feature to an online meeting, arranged in accordance with at least some embodiments described herein.

FIG. 8 illustrates a logic flow diagram for an example client-side process to restore a join feature to an online meeting, arranged in accordance with at least some embodiments described herein. Process 800 may be implemented on a client device. An example client device may include a communication interface configured to facilitate communication between a productivity service and the client device, a memory configured to store instructions, and one or more processors coupled to the memory and configured to execute a communication module, wherein the communication module is configured to restore a join feature to an online meeting. In some embodiments, the communication module may be an integral component of an application associated with the productivity service that is being executed on the client device.

Process 800 begins with operation 810, where the communication module may receive an online meeting. The online meeting may be newly generated meeting received from the productivity service or a third party service, such as a calendar provider. Alternatively, the online meeting may be an existing meeting that has been edited by an organizer or invitees of the online meeting.

At operation 820, the communication module may detect an absence of metadata associated with the join feature upon analysis of the online meeting. The absent metadata may include information to generate and/or insert a join feature, such as a join link, into the online meeting.

At operation 830, the communication may parse a body of the online meeting to detect a collection of URLs by employing pattern matching. At operation 840, the productivity service may verify each of the URLs of the collection with a HTTP get operation to determine whether any of the URLs have an online meeting identifier.

At operation 850, upon determination that a URL from the collection comprises an online meeting identifier, the communication module may recreate the metadata with the URL to generate the join feature. Additionally, the communication module may recreate the metadata with the URL to generate the join feature in response to a determination that multiple URLs of the collection comprise a same online meeting identifier. The join feature may be a join link and/or a join button configured to execute an operation to join the online meeting.

The operations included in process 800 are for illustration purposes. Restoration of a join feature to an online meeting may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, means to restore a join feature to an online meeting are provided. Example means may include receiving an online meeting, detecting an absence of metadata associated with the join feature upon an analysis of the online meeting, parsing a body of the online meeting to detect a collection of URLs, verifying each URL from the collection with a hypertext transport protocol (HTTP) get operation, and in response to a determination that a URL from the collection comprises an online meeting identifier, recreating the metadata with the URL to generate the join feature.

According to some examples, methods to restore a join feature to an online meeting are provided. An example method may include receiving an online meeting, detecting an absence of metadata associated with the join feature upon an analysis of the online meeting, parsing a body of the online meeting to detect a collection of URLs, verifying each URL from the collection with a hypertext transport protocol (HTTP) get operation, and in response to a determination that a URL from the collection comprises an online meeting identifier, recreating the metadata with the URL to generate the join feature.

In other examples, the online meeting may be received from an application associated with the productivity service following generation of the online meeting by an organizer through the application or the online meeting may be received from a third party service. Pattern matching may be employed to detect the collection within the body of the online meeting. Recreation of the metadata with the URL to generate the join feature may be foregone in response to a determination that no URL from the collection comprises an online meeting identifier or in response to a determination that more than one URL from the collection of one or more URLs comprises an online meeting identifier and the respective online meeting identifiers are distinct.

In further examples, duplicate URLs may be removed from the collection prior to verification. Verification of each URL from the collection with the HTTP get operation may include determining whether each URL comprises an online meeting identifier. The join feature may be displayed through an invitation to the online meeting. The metadata associated with the join feature may include information to generate and insert the join feature into the online meeting. The join feature may be a join link or a join button configured to execute an operation to join the online meeting.

According to some embodiments, client devices to restore a join feature to an online meeting may be described. An example client device may include a communication interface configured to facilitate communication between a productivity service and the client device, a memory configured to store instructions, and one or more processors coupled to the memory and configured to execute a communication module. The communication module may be configured to receive an online meeting from the productivity service, detect an absence of metadata associated with the join feature upon an analysis of the online meeting, parse a body of the online meeting to detect a collection of URLs, verify each URL from the collection with a HTTP get operation, and in response to a determination that a URL from the collection comprises an online meeting identifier, recreate the metadata with the URL to generate the join feature.

In other embodiments, the body of the online meeting may be formatted in hypertext markup language (HTML). The online meeting received may be a newly generated online meeting or may be an existing online meeting that has been edited. The communication module may be an integral module of one or more applications of the productivity service being executed by the client device, where the applications may include a communication application, a calendar application, a word-processing application, a notebook application, and a spreadsheet application.

According to some examples, methods to restore a join feature to an online meeting may be provided. An example method may include receiving an online meeting, detecting an absence of metadata associated with the join feature upon an analysis of the online meeting, parsing a body of the online meeting to detect a collection of URLs by employing pattern matching, removing duplicate URLs from the collection, and verifying each remaining URL from the collection with a hypertext transport protocol (HTTP) get operation. The example method may further include, in response to a determination that a URL from the collection of one or more URLs comprises an online meeting identifier, recreating the metadata with the URL to generate the join feature, and displaying the join feature through an invitation to the online meeting.

In other examples, recreation of the metadata with the URL to generate the join feature may be foregone in response to a determination that no URL from the collection comprises an online meeting identifier or in response to a determination that more than one URL from the collection comprises an online meeting identifier and the respective online meeting identifiers are distinct. The online meeting is re-analyzed in response to a determination that the online meeting is edited to determine whether there is an absence of metadata associated with the join feature.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to restore a join feature to an online meeting; the method comprising:
   receiving an online meeting;
   detecting an absence of a join Uniform Resource Locator (URL) of the online meeting;
   parsing a body of the online meeting to detect a collection of one or more URLs;

verifying each URL from the collection of one or more URLs with a hypertext transport protocol (HTTP) get operation;

in response to a determination that a URL from the collection of one or more URLs comprises an online meeting identifier of the online meeting:

generating the join URL to include the online meeting identifier, wherein the join URL is configured to execute an operation to join the online meeting, and displaying a user interface configured to access the join URL.

2. The method of claim 1; wherein receiving the online meeting comprises:

receiving the online meeting from an application associated with a productivity service following generation of the online meeting by an organizer through the application.

3. The method of claim 1, wherein receiving the online meeting comprises:

receiving the online meeting from a third party service.

4. The method of claim 1, wherein parsing the body of the online meeting to detect the collection of the one or more URLs comprises:

employing pattern matching to detect the collection of one or more URLs within the body of the online meeting.

5. The method of claim 4, further comprising:

in response to a determination that no URL from the collection of one or more URLs comprises an online meeting identifier, foregoing-generation of the join URL.

6. The method of claim 4, further comprising:

in response to a determination that more than one URL from the collection of one or more URLs comprises an online meeting identifier and the respective online meeting identifiers are distinct, foregoing generation of the join URL.

7. The method of claim 1, further comprising:

removing duplicate URLs from the collection of one or more (URLs) prior to the verification of each URL.

8. The method of claim 1, wherein verifying each URL from the collection of one or more URLs with the HTTP get operation comprises:

determining whether each URL comprises an online meeting identifier.

9. The method of claim 1, further comprising:

displaying the join URL through an invitation to the online meeting.

10. The method of claim 1, wherein a join button is configured to access the join URL to join the online meeting.

11. A client device to restore a join feature to an online meeting, the client device comprising:

a memory configured to store instructions; and one or more hardware processors coupled to the memory and configured, by the instructions, to:

receive an online meeting;

detect an absence of a join Uniform Resource Locator (URL) of the online meeting;

parse a body of the online meeting to detect a collection of one or more uniform resource locators (URLs);

verify each URL from the collection of one or more URLs with a hypertext transport protocol (HTTP) get operation;

in response to a determination that a URL from the collection of one or more URLs comprises an online meeting identifier of the online meeting:

generate the join URL to include the online meeting identifier, wherein the join URL is configured to execute an operation to join the online meeting, and display a user interface configured to access the join URL.

12. The client device of claim 11, wherein the body of the online meeting is formatted in hypertext markup language (HTML).

13. The client device of claim 11, wherein the online meeting received is a newly generated online meeting.

14. The client device of claim 11, wherein the online meeting received is an existing online meeting that has been edited.

15. A method to restore a join feature to an online meeting, the method comprising:

receiving an online meeting;

detecting an absence of a join Uniform Resource Locator (url) of the online meeting;

parsing a body of the online meeting to detect a collection of one or more uniform resource locators (URLs) by employing pattern matching;

removing duplicate URLs from the collection of one or more URLs;

verifying each remaining URL from the collection of one or more URLs with a hypertext transport protocol (HTTP) get operation;

in response to a determination that a URL from the collection of one or more URLs comprises an online meeting identifier of the online meeting:

generating the join URL to include the online meeting identifier, wherein the join URL is configured to execute an operation to join the online meeting; and displaying a user interface configured to access the join URL.

16. The method of claim 15, further comprising:

in response to a determination that no URL from the collection of one or more URLs comprises an online meeting identifier or in response to a determination that more than one URL from the collection of one or more URLs comprises an online meeting identifier and the respective online meeting identifiers are distinct, foregoing generation of the join URL.

17. The method of claim 15, further comprising:

in response to a determination that the online meeting is edited, re-analyzing the online meeting to determine whether there is an absence of a join URL within the online meeting.

* * * * *